Jan. 23, 1968    J. PICKLES    3,365,163
SEAT ADJUSTMENT MECHANISM
Filed March 31, 1966    2 Sheets-Sheet 1

INVENTOR.
JOSEPH PICKLES
BY Whittemore,
Hulbert & Belknap
ATTORNEYS

Jan. 23, 1968   J. PICKLES   3,365,163
SEAT ADJUSTMENT MECHANISM
Filed March 31, 1966   2 Sheets-Sheet 2

INVENTOR.
JOSEPH PICKLES
BY *Whittemore,*
*Hulbert & Belknap*
ATTORNEYS

United States Patent Office 3,365,163
Patented Jan. 23, 1968

3,365,163
SEAT ADJUSTMENT MECHANISM
Joseph Pickles, Dearborn, Mich., assignor to Ferro Manufacturing Corporation, Detroit, Mich., a corporation of Michigan
Continuation-in-part of application Ser. No. 480,024, Aug. 16, 1965. This application Mar. 31, 1966, Ser. No. 539,037
3 Claims. (Cl. 248—420)

This is a continuation-in-part of application Ser. No. 480,024, filed Aug. 16, 1965, now abandoned.

The present invention relates to seat adjustment mechanism.

It is an object of the present invention to provide a vehicle seat including adjustment mechanism for effecting generally vertical and horizontal movement of the seat including compact efficient motor means for effecting the required adjustments.

It is a further object of the present invention to provide a vehicle seat as described in the preceding paragraph, motor means comprising a plurality of independently rotatable parallel closely spaced armatures associated with permanent magnets.

It is a further object of the present invention to provide a construction as described in the preceding paragraph comprising iron shell structure providing flux paths interconnecting the poles of said magnets.

It is a further object of the present invention to provide structure as described in the preceding paragraph in which the magnets are generally semi-cylindrical having an annular extent of somewhat less than 180 degrees, are magnetized with opposite poles at the inner concave and outer convex surfaces, and are arranged in opposed pairs having opposite polarity at the opposed inner concave surfaces thereof.

It is a further object of the present invention to provide an electric motor comprising a plurality of parallel closely spaced rotatable armatures, a pair of generally semi-cylindrical permanent ceramic magnets provided at opposite sides of each armature, a continuous iron shell extending around all of said magnets and said armatures and providing a flux path for said magnets, the adjacent magnets at the same side of said motor having opposite polarity as regards the inner concave and outer convex surfaces thereof.

It is a further object of the present invention to provide a seat construction including seat adjusting means having rotary driven elements, motor means, one or more flexible drive shafts connecting the motor means to the rotary driven elements of the seat supporting and adjusting devices including readily releasable clamp means effective to provide accurate location and positive retention of the end of the flexible drive shaft in a suitable recess provided in said rotary driven element.

Other objects and features of the invention will become apparent as the description proceeds, especially when taken in conjunction with the accompanying drawings, illustrating preferred embodiments of the invention, wherein.

Figure 1:
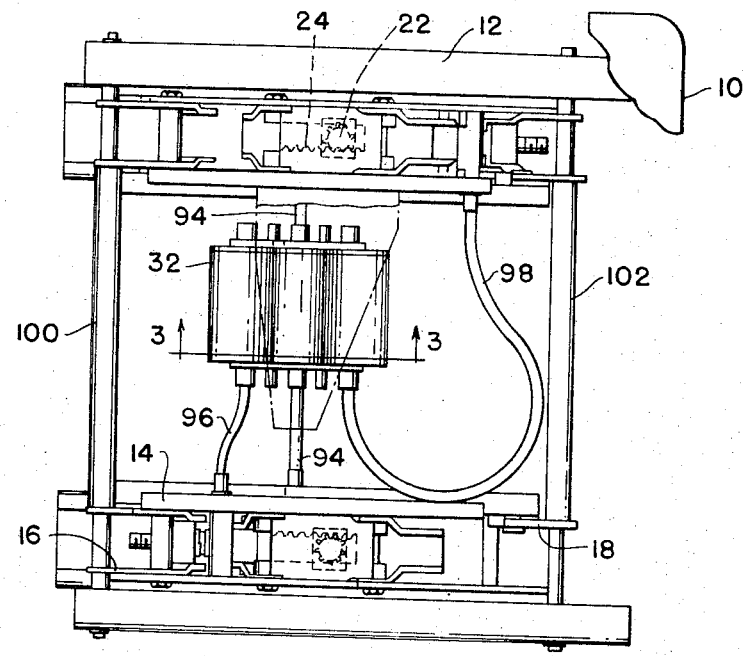
FIGURE 1 is a view illustrating the seat supporting and adjusting mechanism and the drive means therefor, with the vehicle seat removed.
Figure 2:
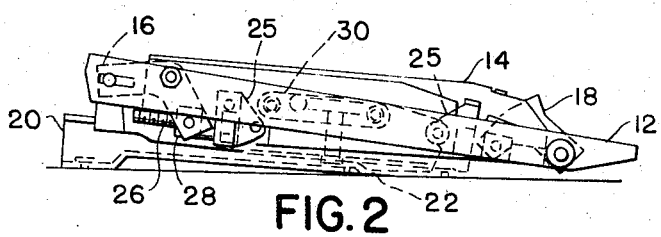
FIGURE 2 is an elevational view of the seat supporting and adjusting mechanism of FIGURE 1.

Referring first to FIGURES 1 and 2 there is illustrated a vehicle seat a portion of which is indicated at 10, the seat being supported on seat support bars 12. The bars 12 are supported from slides 14 by levers 16 and 18. The slides 14 are longitudinally movable on tracks 20 and movement of the slides is effected by pinions 22 associated with racks 24.

With this mechanism it is possible to effect fore and aft adjustment of the seat by rotation of the pinions 22, tilting of the seat by selective actuation of the levers 16 and 18, and generally vertical movement of the seat by simultaneous actuation of the levers 16 and 18 in the same direction.

This seat supporting and adjusting mechanism is more fully disclosed in my prior copending application Ser. No. 480,024 and will not be further described herein. However, it will be noted that the mechanism for effecting tilting of the levers 16 and 18 includes actuating means 25 each of which includes a rotary driven element which will subsequently be described in detail. Operation of the rotary driven element drives threaded shafts one of which is indicated at 26, which are associated with nuts 28 carried by the levers 16 and 18. Similarly, rotation of the pinions 22 is accomplished by actuating means indicated generally at 30 which also include rotatable driven elements.

The means for effecting power adjustment of the seat includes a motor 32 of special design. For the seat supporting and adjusting mechanism disclosed in FIGURES 1 and 2, which calls for independent adjustment of three separate devices, the motor 32 comprises three separately rotatable closely spaced parallel armatures 34. Associated with each armature 34 is a pair of generally semi-cylindrical permanent ceramic magnets 36 which are available under the trademark "Indox" and which are described as having the chemical composition $BaFe_{12}O_{19}$. Each of the magnets has an angular extent of somewhat less than 180 degrees so as to leave the magnets in the spaced relationship illustrated. It may be noted at this time however, that the spacing indicated at 38 between adjacent magnets at the same side of the motor is not essential and the magnets may if desired contact throughout this zone.

In accordance with a first embodiment of the present invention all of the cylindrically shaped ceramic magnets 36 at the same side of the motor 32 may have identical polarity and this relationship is indicated in the drawing where the letters N and S are applied to the magnets to indicate the polarity thereof. It is to be understood that the illustrated polarity is such that each of the generally semi or partly cylindrical magnets has its inner concave surface acting as a single continuous pole face which is opposite in polarity from the outer convex surface. With the relationship illustrated in FIGURE 3 it will be observed that each of the armatures 34 is associated with a pair of partly cylindrical magnets, the polarity of each of the magnets of a pair associated with a single armature being reversed. That is to say, the magnets illustrated in association with the left hand armature 34 are, at the upper side of the motor, a magnet having its inner concave surface a south pole whereas the opposed magnet at the underside of the motor has its inner concave surface a north pole. It will be observed that in the illustrated embodiment of FIGURE 3 all of the magnets at the upper side of the motor as seen in this figure have inner concave south poles, whereas all of the magnets at the lower side of the motor as illustrated in this figure, have inner concave north poles.

Surrounding the assembly of magnets and armatures is a single continuous iron shell 40 which not only supports the ceramic magnets in the illustrated relationship, but which constitutes a support for the entire motor structure and most importantly, provides a flux path suitably interconnecting the ceramic magnets. It may be mentioned at this time that the ceramic magnets 36, unlike previously known permanent magnets, have a permeability not much greater than the permeability of air.

Figure 3:
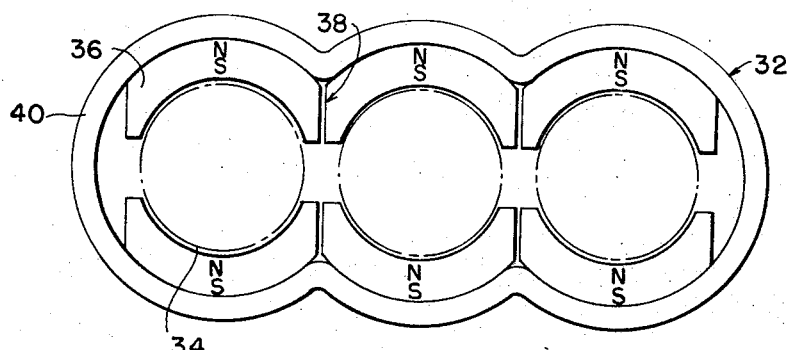
FIGURE 3 is an enlarged cross-sectional view on the line 3—3, FIGURE 1, illustrating the basic construction of the power motor means.

While the arrangement of magnets illustrated in FIGURE 3 gives excellent operating results, an appreciable improvement is noted if the polarity of the magnets associated with the central armature is reversed with respect to the polarity of the magnets associated with the end armatures. In other words, in this embodiment of the invention the magnet 36 at the upper side of the motor associated with the central armature has a north pole provided at its inner concave surface and its south pole provided at the outer convex surface. With this arrangement it is of course essential to similarly reverse the polarity of the magnet at the underside of the motor as illustrated in FIGURE 3, associated with the central armature.

A very important advantage of the present construction is the provision of a motor which is extremely compact and permits the housing of the motor beneath a seat which is relatively close to the floor. In present automotive design this contributes to the desirable low profile effect. This result is obtained in a most efficient manner since the individual armatures 34 with their associated permanent magnets 36 may be designed for the specific load required by the seat adjusting mechanism. This avoids the difficulty previously encountered in providing motor means sufficiently powerful to handle the heaviest load in seat adjusting which is therefore grossly overpowered when performing seat adjustment movements requiring less power. Moreover, the present arrangement of multiple armatures each of which is provided with a pair of separate permanent ceramic magnets, provide increased efficiently since the pair of magnets associated most particularly with each armature are also effective to a degree to increase the density of the flux traversing the adjacent armatures.

Another very significant advantage of the present construction is in economy since the separate armature components of the single motor may be designed in association with the magnets to permit direct coupling between the rotatable armatures and the rotatable driven elements of the seat actuating devices. Therefore, each armature may be selectively energized and remain at all times coupled with the actuating means intended to be operated thereby. This eliminates the necessity for expensive gearing and clutches and contributes to the overall economy and efficiency of the construction.

Referring now to FIGURES 4–8, an improved construction of means providing a connection between the motor 32 and the several actuating means is illustrated.

Figure 4:
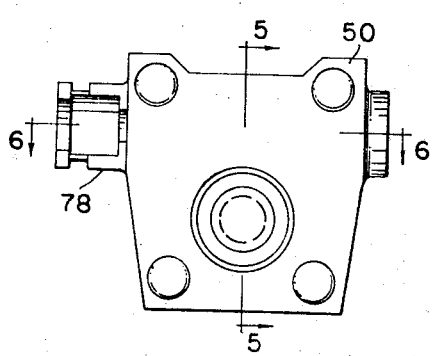
FIGURE 4 is an elevational view of actuating means associated with the seat supporting and adjusting devices.
Figure 5:
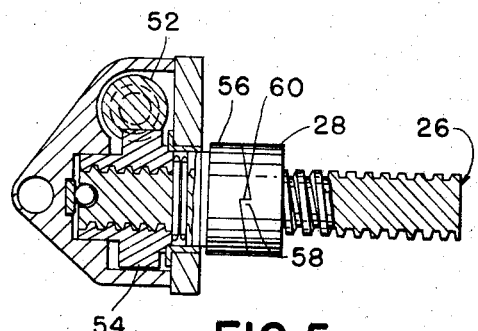
FIGURE 5 is a sectional view on the line 5—5, FIGURE 4.
Figure 6:
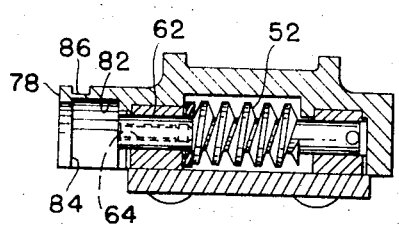
FIGURE 6 is a sectional view on the line 6—6, FIGURE 4.

Referring first to FIGURES 4–6 the actuating means is shown as comprising a housing 50 which contains a worm 52 in mesh with a worm gear 54 carried by a threaded shaft 26. Where the operating means is intended to swing the levers 16 or 18, this is accomplished by providing the nut 28 on the shaft 26. In order to prevent jamming of the nut 28 when it reaches one limiting position an abutment element 56 is provided having a shoulder 58 engageable by a shoulder 60 on the nut 28. The shoulders 58 and 60 extend substantially radially of the nut 28 and abutment element 56 so that there is no tendency for jamming of the nut 28.

Figure 8:
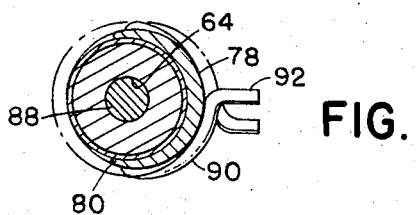
FIGURE 8 is a section on the line 8—8, FIGURE 7.

The worm 52 is provided at one end with an elongated shank 62 provided with a non-circular opening 64 which as illustrated in FIGURE 8, may be of square cross-section. The worm 52 is driven from the motor through a flexible drive shaft 70 which is rotatable within a flexible sheath 72 provided at one end with a ferrule 74 having an enlarged end portion 76. A problem which in the past has given rise to considerable difficulty is the coupling of the flexible drive shaft to the rotatable driven element or worm 52. It is essential for the end of the drive shaft to be firmly and strongly supported in exactly centered relation with respect to the shank 62. In the present case this is accomplished by providing the housing 50 with an elongated roughly semi-cylindrical support portion 78. As best seen in FIGURE 8, this support portion has an angular extent slightly in excess of 180 degrees, thus providing edge lips 80. In addition, the generally cylindrically formed interior of the support portion 78 is laterally recessed as indicated at 82, thereby providing a substantially semi-circular shoulder 84 for a purpose which will presently appear. The exterior of the generally semi-circular support portion has an annular groove 86.

Figure 7:
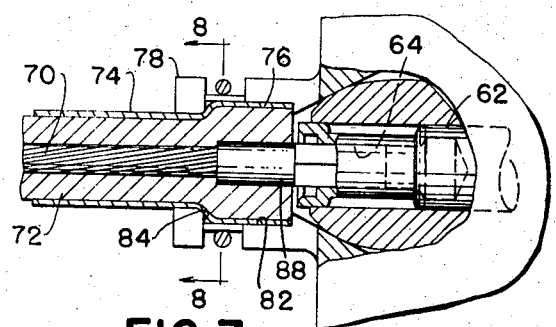
FIGURE 7 is an enlarged fragmentary view illustrating the connection between the flexible drive shaft and the actuating unit.

Referring now more particularly to FIGURES 7 and 8, it will be observed that the enlarged head portion 76 of the sheath 72 is received in the radially enlarged chamber or recess 82, and that the shoulder intermediate the ends of the ferrule 74 engages the shoulder 84 provided in the support portion 78.

The flexible drive shaft 70 includes an end portion 88 which may be of square cross-section as shown, and which fits snugly within the elongated opening 64 provided in the end of the shank 62.

The inner generally cylindrically shaped surface of the support portion 78 engages a substantial length of the enlarged head 76 of the ferrule 74 and thus provides for accurate location of the end of the flexible drive shaft 70. The parts are retained in assembled relation by a resilient clip 90 which has an angular extent of slightly more than 360 degrees and which is provided with generally radially extending ears 92 which may be pressed together to enlarge the ring so as to permit it to be positioned in the annular groove 86 at one side of the support portion 78 and to engage the enlarged head portion 76 of the ferrule 74. This arrangement provides for fully adequate support and accurate location of the driving end 88 of the flexible drive shaft 70 in a manner to permit ready assembly thereof and to provide for quiet vibration-free transmission of rotation to the driven element of the operating means.

A similar construction is provided for connecting the ends of flexible cables 94 which transmit rotation to the pinions 22 for effecting fore and aft movement of the slides 14. It will be observed that while the motor 32 is connected by means of two flexible drive shafts or cables 94 to the rack engaging pinions 22, the transmission for effecting substantial vertical movement of the front and rear edges of the seats comprises single flexible drive shafts 96 and 98. The lift levers, as more fully described in my prior copending application Ser. No. 480,024, are caused to rotate in synchronism by means of torque bars 100 and 102.

While a preferred form of motor including a specific arrangement of permanent ceramic magnets has been described in the foregoing, it is to be understood that variations in the detailed construction of the motor are contemplated. In practice, the magnetic means may comprise one single magnet suitably magnetized to provide pole placement as required; or it may comprise two magnets suitably magnetized and arranged to provide for the required flux distribution; or it may comprise a plurality of pairs of independent magnets, each pair of magnets being associated with a single armature.

Figure 9:
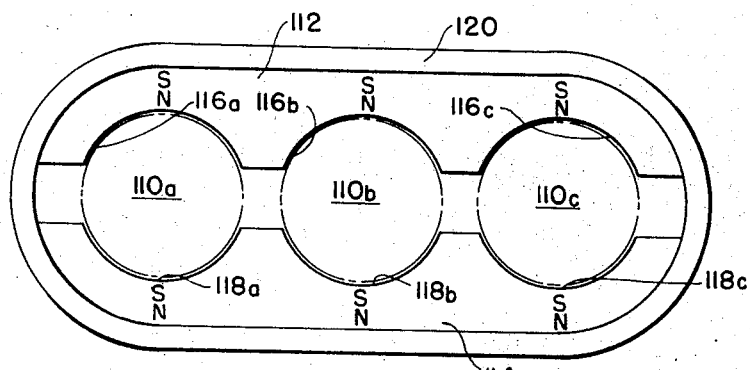
FIGURE 9 is an elevational view of a differently designed motor employing permanent ceramic magnets.

Referring now to FIGURE 9 there is illustrated one of the foregoing arrangements in which a pair of suitably magnetized permanent ceramic magnets is employed. In this figure three parallel closely spaced rotatable armatures 110a, 110b and 110c with their axes occupying a common plane are provided. The magnetic fields for these armatures are provided by two elongated permanent ceramic magnets 112 and 114. The magnets 112 and 114 respectively extend along one side of the array of armatures 110a, 110b, and 110c and are each provided with a plurality (in the illustrated embodiment, three) cylindrically formed recesses 116a, 116b, and 116c for the magnet 112, and 118a, 118b and 118c for the magnet 114.

The magnet 112 is polarized so that its inner surface, confronting the armatures 110a, 110b and 110c, is a north magnetic pole throughout, whereas the magnet 114 has its inner surface confronting the armatures 110a, 110b and 110c and is a south magnetic pole throughout. This of course requires that the outer surface of the magnet 112 is a south pole whereas the outer surface of the magnet 114 is a north pole. The polarity of the magnets is indicated in FIGURE 9.

Both of the magnets 112 and 114 have their outer surface in the form of a flat planar surface adapted to engage the inner surface of an iron shell or casing 120 which extends continuously around the motor and provides a path for magnetic flux interconnecting the outer north pole of the magnet 114 to the outer south pole of the magnet 112.

This arrangement offers the advantage that the iron shell or casing is of the simplest possible configuration comprising flat side portions interconnected by generally semi-cylindrical end portions.

The drawings and the foregoing specification constitute a description of the improved seat adjustment mechanism in such full, clear, coincise and exact terms as to enable any person skilled in the art to practice the invention, the scope of which is indicated by the appended claims.

What I claim as my invention is:

1. A vehicle seat construction comprising a seat, power seat adjusting mechanism comprising a pair of similar elongated longitudinally extending seat supporting and adjusting devices adapted to support opposite ends of said vehicle seat, said devices comprising a first operating system including a first rotary driven element for effecting generally up and down movement of the seat and a second operating system including a second rotary driven element for effecting generally fore and aft movement of the seat, motor means disposed beneath said seat and comprising a pair of selectively operable rotary output drives, flexible drive shafts each connecting said drives to said rotary driven elements, said flexible drive shafts having a flexible sheath within which the drive shaft is rotatable, the drive shaft having a portion extending beyond the end of said sheath, and detachable connections between said flexible drive shafts and said driven elements, each of said connections comprising an elongated generally semi-cylindrical support portion in axial alignment with the associated driven element and shaped to interfit with the end of said sheath, said driven element having a non-circular recess shaped to receive and interfit in driving relation with the non-circular end of said flexible shaft, and resilient clamp means surrounding said elongated generally semi-cylindrical support portion and the end portion of said sheath received therein and engaged to press the end portion of said sheath into firm guided supporting contact with said support.

2. A seat construction as defined in claim 1 in which the elongated generally semi-cylindrical support includes a laterally extending recess providing a generally semi-circular support shoulder, the end of said sheath having a ferrule shaped to interfit in said recess and having a surface engageable with said semi-circular surface to prevent withdrawal of said sheath and drive shaft except upon release of said clamp.

3. A seat construction as defined in claim 1 in which said clamp is in the form of a circularly shaped resilient wire element somewhat in excess of 360 degrees and provided with generally radialy exending bars in proximity to each other whereby release of said clamp is effected by pressing said ears towards each other.

References Cited
UNITED STATES PATENTS

| | | | |
|---|---|---|---|
| 1,131,921 | 3/1915 | Fischer | 310—154 |
| 1,575,538 | 3/1926 | Bushnell | 310—114 X |
| 2,059,886 | 11/1936 | Merrill | 310—154 |
| 2,717,969 | 9/1955 | Buchhald et al. | 310—112 |
| 2,929,439 | 3/1960 | Tanaka et al. | 248—393 |
| 2,939,024 | 5/1960 | Mabuchi | 310—154 |
| 3,081,973 | 3/1963 | Arlauskas et al. | 248—393 |
| 3,089,676 | 5/1963 | Pickles | 248—394 |
| 3,124,332 | 3/1964 | Heyl | 248—420 |
| 3,215,875 | 11/1965 | Latta | 310—154 |

ROY D. FRAZIER, *Primary Examiner.*

CLAUDE A. LE ROY, *Examiner.*

R. P. SEITTER, *Assistant Examiner.*